(No Model.)
G. W. RITCHIE.
SAFETY ATTACHMENT FOR HORNED ANIMALS.
No. 296,625. Patented Apr. 8, 1884.
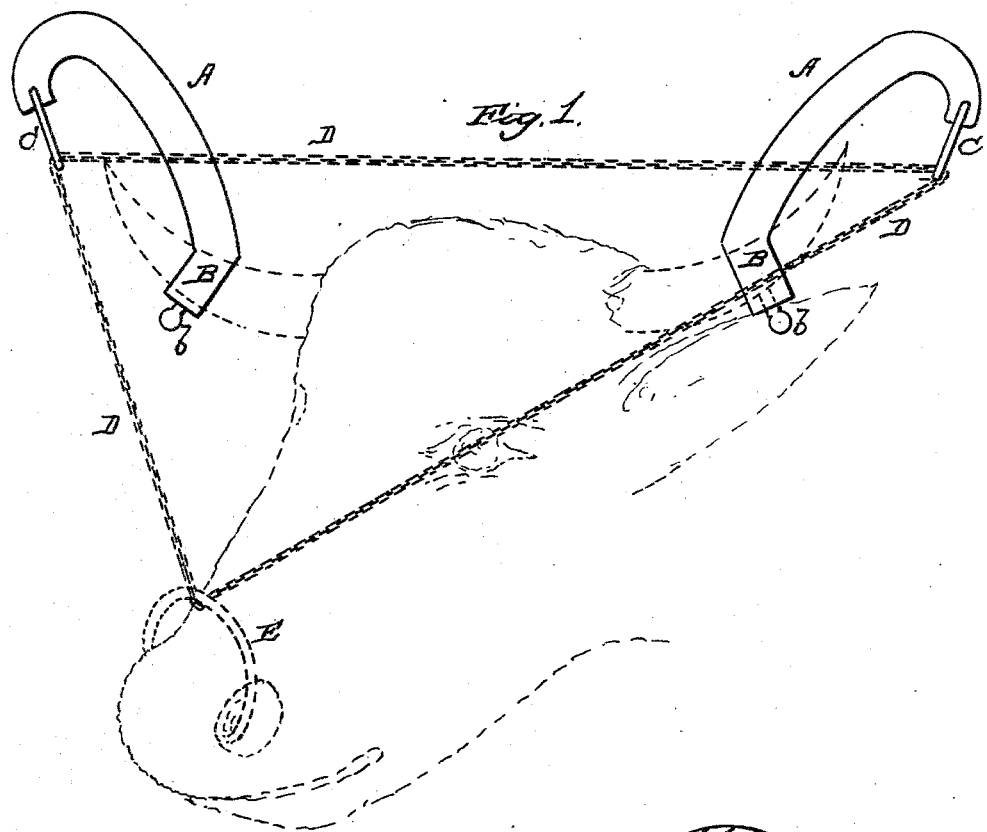
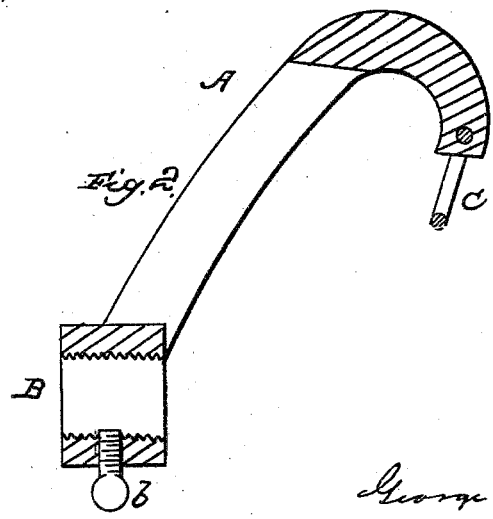
WITNESSES
INVENTOR
George W. Ritchie
per D. C. Allen
his ATTORNEY

UNITED STATES PATENT OFFICE.

GEORGE W. RITCHIE, OF ARROWSMITH, ILLINOIS.

SAFETY ATTACHMENT FOR HORNED ANIMALS.

SPECIFICATION forming part of Letters Patent No. 296,625, dated April 8, 1884.

Application filed December 21, 1883. (No model.)

*To all whom it may concern:*

Be it known that I, GEORGE W. RITCHIE, of Arrowsmith, in the county of McLean, and in the State of Illinois, have invented certain new and useful Improvements in Safety Attachments for Horned Animals; and I do hereby declare that the following is a full, clear, and exact description thereof, reference being had to the accompanying drawings, and to the letters of reference marked thereon, making a part of this specification, and in which—

Figure 1 is a view in perspective, showing my safety attachment secured to an animal. Fig. 2 is a sectional detail of the guard.

This invention relates to safety attachments for horned animals; and its object is to protect attendants and others from attack and injury by vicious brutes, and to render such brutes harmless and easily controlled.

To this end the invention consists in a chain, rope, or other equivalent device connecting the usual nose-ring with the horns of the animal in such a manner that an attempt to use the horns will cause an upward pull upon the nose-ring and occasion such discomfort as to cause the animal to desist from its attack.

In carrying out my invention I secure to each horn of the animal a guard, A, and connect the outer end of each of said guards to the usual nose-ring, E, by means of chains D or other equivalent devices.

At the base of the guard A is a ring or collar, B, which I prefer to provide with female threads, as shown in Fig. 2, though these threads are not essential to the successful operation of the device, as the collar B is firmly secured to the horn by the set-screw *b*. The shape and length of the guards will in some instances be determined by the shape of the horns of different animals, keeping always in mind that the upper ends of the guards should have a curved form not likely to catch or pierce the clothing or person, and that said upper ends of the guards should extend so far forward of the horns as to keep the chains D free from the face of the animal.

In the form illustrated in the drawings the guards curve upward and outward a sufficient distance to clear the ends of the horns, and are then curved downward and provided at their ends with rings C, to which one end of the chain D is attached, the other end of said chain being secured to the nose-ring E, as before stated. These chains should be taut and hang free from the face of the animal, but should not be so taut as to normally cause an undue upward pressure or strain on the nose-ring.

My preferred form of safety attachment is constructed as above described, a chain, D, connecting each guard with the nose-ring E, and being independent of each other; but, if preferred, the chain D may form a continuous connection from guard to guard, and from the respective guards to the nose-ring, as shown in Fig. 1, so that pressure exerted at any point on the chain will give a simultaneous pull on both sides of the nose-ring in the direction of the guards.

It is obvious that instead of the set-screw *b* a spring-bolt might be used to lock the collars onto the horns; or a groove might be formed in the horn and the interior of the collar for the reception of a key.

What I claim as new, and desire to secure by Letters Patent, is—

1. A safety attachment for horned animals, consisting of the guards constructed to be secured to the horns of an animal, and a chain or chains for connecting the outer ends of said guards with a nose-ring.

2. The combination, substantially as before set forth, of the guards provided at the base with a collar and at their upper curved ends with a ring or loop, means for locking said collars to the horns of an animal, and chains for connecting the curved ends of the guards with a nose-ring.

3. The combination, substantially as described, of the guards provided at the base with a threaded collar, means for locking said collar to the horns of an animal, and chains for connecting the upper ends of the guards with a nose-ring.

4. The combination, substantially as described, of the guards constructed to be secured to the horns of an animal, and a chain for connecting the outer ends of the guards with each other and with a nose-ring.

In testimony that I claim the foregoing I have hereunto set my hand this 6th day of November, 1883.

GEORGE W. RITCHIE.

Witnesses:
 THOS. SLADE,
 J. W. DAVES.